(12) United States Patent
Poché

(10) Patent No.: US 12,478,062 B2
(45) Date of Patent: Nov. 25, 2025

(54) BAIT COMPOSITION

(71) Applicant: Scimetrics Limited Corp., Wellington, CO (US)

(72) Inventor: Richard Poché, Wellington, CO (US)

(73) Assignee: Scimetrics Limited Corp., Wellington, CO (US)

(*) Notice: Subject to any disclaimer, the term of this patent is extended or adjusted under 35 U.S.C. 154(b) by 471 days.

(21) Appl. No.: 17/860,771

(22) Filed: Jul. 8, 2022

(65) Prior Publication Data

US 2022/0338461 A1 Oct. 27, 2022

Related U.S. Application Data

(63) Continuation of application No. 16/396,330, filed on Apr. 26, 2019, now Pat. No. 11,382,325, which is a continuation of application No. 15/241,840, filed on Aug. 19, 2016, now abandoned.

(51) Int. Cl.
| | |
|---|---|
| *A01N 25/00* | (2006.01) |
| *A01K 5/01* | (2006.01) |
| *A01M 25/00* | (2006.01) |
| *A01N 43/16* | (2006.01) |
| *A23K 20/111* | (2016.01) |
| *A23K 50/30* | (2016.01) |

(52) U.S. Cl.
CPC .............. *A01N 25/002* (2013.01); *A01K 5/01* (2013.01); *A01M 25/002* (2013.01); *A01N 43/16* (2013.01); *A23K 20/111* (2016.05); *A23K 50/30* (2016.05)

(58) Field of Classification Search
CPC .... A23K 50/30; A01N 25/002; A01M 25/002
See application file for complete search history.

(56) References Cited

U.S. PATENT DOCUMENTS

| | | |
|---|---|---|
| 1,011,207 A | 12/1911 | Kemp |
| 1,093,691 A | 4/1914 | Fritsch |
| 1,307,763 A | 6/1919 | Sterbenz |
| 1,532,584 A | 4/1925 | Hanson et al. |
| 2,188,652 A | 1/1940 | Cress |
| 2,651,138 A | 9/1953 | Malloy |
| 3,629,390 A | 12/1971 | Wentworth |
| 4,766,692 A | 8/1988 | Shudren |
| 5,720,951 A | 2/1998 | Baker |
| 5,852,987 A | 12/1998 | Lamp, Jr. |
| 5,864,982 A | 2/1999 | Tully et al. |
| 6,264,969 B1 | 7/2001 | Poche |

(Continued)

FOREIGN PATENT DOCUMENTS

JP 2002-272352 9/2002

OTHER PUBLICATIONS

Corresponding Australian Patent Application No. 2017312433, Examination Report No. 1, dated Aug. 24, 2022, 4 pages.

(Continued)

*Primary Examiner* — Monica L Perry
(74) *Attorney, Agent, or Firm* — Craig R. Miles; CR MILES P.C.

(57) ABSTRACT

Disclosed herein are embodiments of a feral hog control system including bait comprising a carrier material and an amount of warfarin, wherein the amount of warfarin is not greater than about 0.01% by weight of the bait. Further disclosed herein are embodiments of a selective access device for permitting selective access to the bait when the bait is disposed within a feeder.

20 Claims, 7 Drawing Sheets

(56) References Cited

U.S. PATENT DOCUMENTS

| | | |
|---|---|---|
| 9,370,177 B2 | 6/2016 | Bajomi et al. |
| 11,083,186 B2 | 8/2021 | Poché |
| 11,382,325 B2 | 7/2022 | Poché |
| 2001/0041737 A1 | 11/2001 | Poche |
| 2008/0160058 A1 | 7/2008 | Staples |
| 2011/0268692 A1 | 11/2011 | Endepols |
| 2016/0227736 A1 | 8/2016 | Monk |
| 2017/0142929 A1 | 5/2017 | Poché |
| 2018/0049424 A1 | 2/2018 | Poché |
| 2018/0049425 A1 | 2/2018 | Poché |

OTHER PUBLICATIONS

Genesis Laboratories, Inc. Feral Hog Control Using a New Bait. PowerPoint Presentation, originally downloaded Apr. 22, 2016, 29 pages.

Fact Sheet for Warfarin, United States Environmental Protection Agency, Document Date Jun. 1, 1991, 5 pages.

Reregistration Eligibility Decision (RED) for Warfarin, United States Environmental Protection Agency, Document Date Jun. 1, 1991, 163 pages.

Erickson, W & Urban, D. (2004). Potential risks of nine rodenticides to birds and nontarget mammals: A comparative approach. US Environmental Protection Agency.

Poché RM, Poché D, Franckowiak G, Somers DJ, Briley LN, Tseveenjav B, et al. (2018) Field evaluation of low-dose. Warfarin baits to control wild pigs (*Sus scrofa*) in North Texas. PLoS One 13(11): e0206070.

A.P. Meehan. (1984). Rats and Mice: Their Biology and Control. Chapter 6. The anticoagulants. I. Introduction. pp. 141-158.

Kim Renfro, "Here's the weird story behind one of the internet's most mind-boggling photos," Mar. 6, 2016, Business Insider. (Year: 2016).

Usingrodenticides, "Texans looks (sic) to rat poison to solve their current hog infestation. What you should know," Nov. 30, 2012, Working with Rat Poison. (Year: 2012).

International PCT Patent Application No. PCT/US17/36869; International Search Report and Written Opinion of the International Searching Authority dated Jun. 9, 2017, 13 pages.

PCT International Patent Application No. PCT/US18/12681; International Search Report and Written Opinion of the International Searching Authority dated Mar. 5, 2018, 15 pages.

U.S. Appl. No. 16/396,330, Office Action mailed May 10, 2021.

BAIT COMPOSITION

I. SUMMARY OF THE INVENTION

A broad object of a particular embodiment of the invention can be to provide a feral hog control system, and methods of making and using such a feral hog control system, whereby the feral hog control system includes bait comprising a carrier material and an amount of warfarin, wherein the amount of warfarin is not greater than about 0.01% by weight of the bait.

Another broad object of a particular embodiment of the invention can be to provide a selective access device for permitting selective access to the bait when the bait is disposed within a feeder, and methods of making and using such a selective access device.

Naturally, further objects of the invention are disclosed throughout other areas of the specification, drawings, and claims.

II. BRIEF DESCRIPTION OF THE DRAWINGS

III. DETAILED DESCRIPTION OF THE INVENTION

Figure 1:
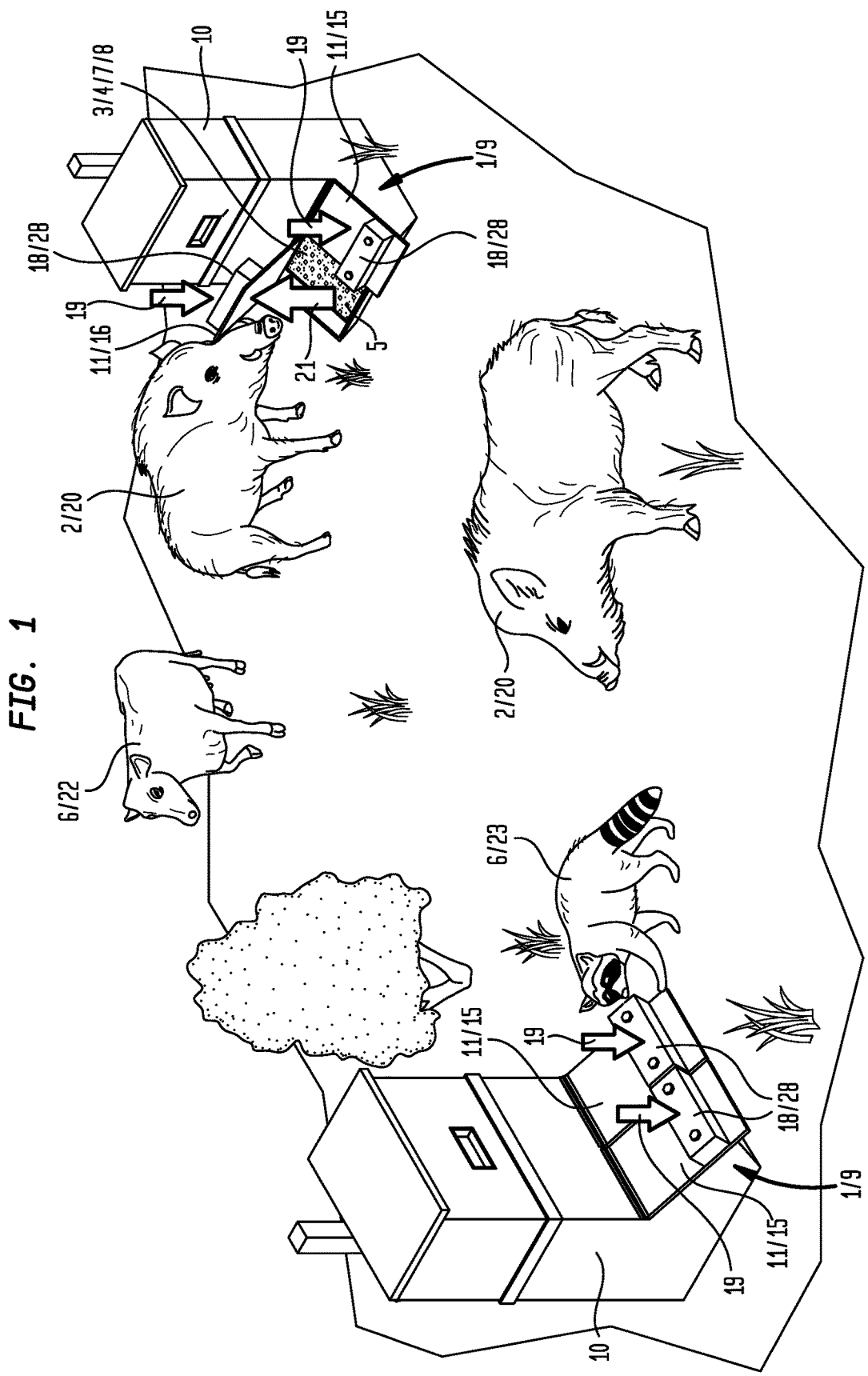
FIG. 1 is an illustration of a method of using a particular embodiment of the feral hog control system including bait and a selective access device coupled to a feeder to permit selective access to the bait disposed within a feeder opening.
Figure 2:
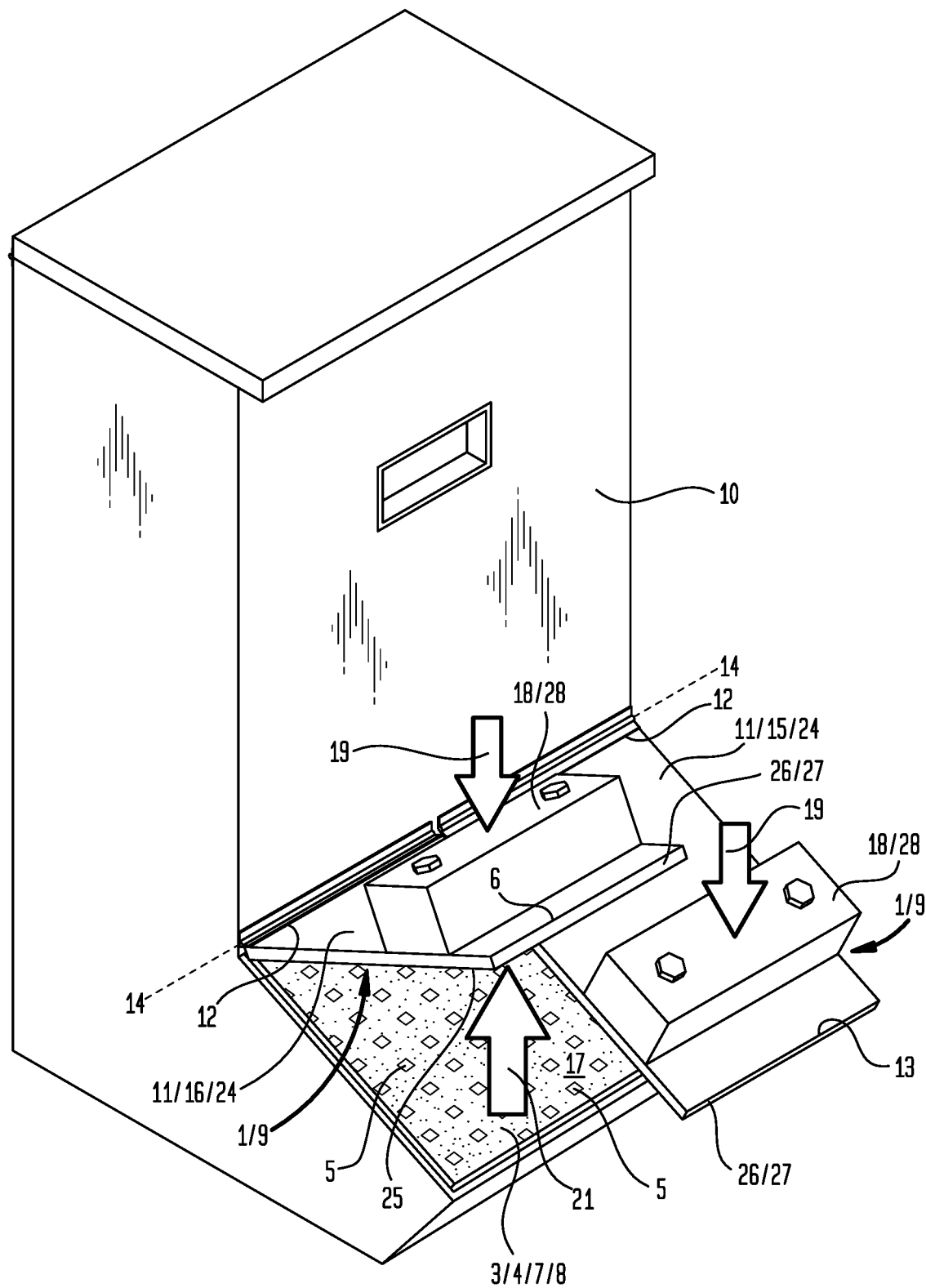
FIG. 2 is a perspective view of the selective access device coupled to a feeder having a pair of covers configured to overlay a feeder opening, whereby one of the pair of covers disposes in a first position and the other of the pair of covers disposes in a second position.
Figure 3:
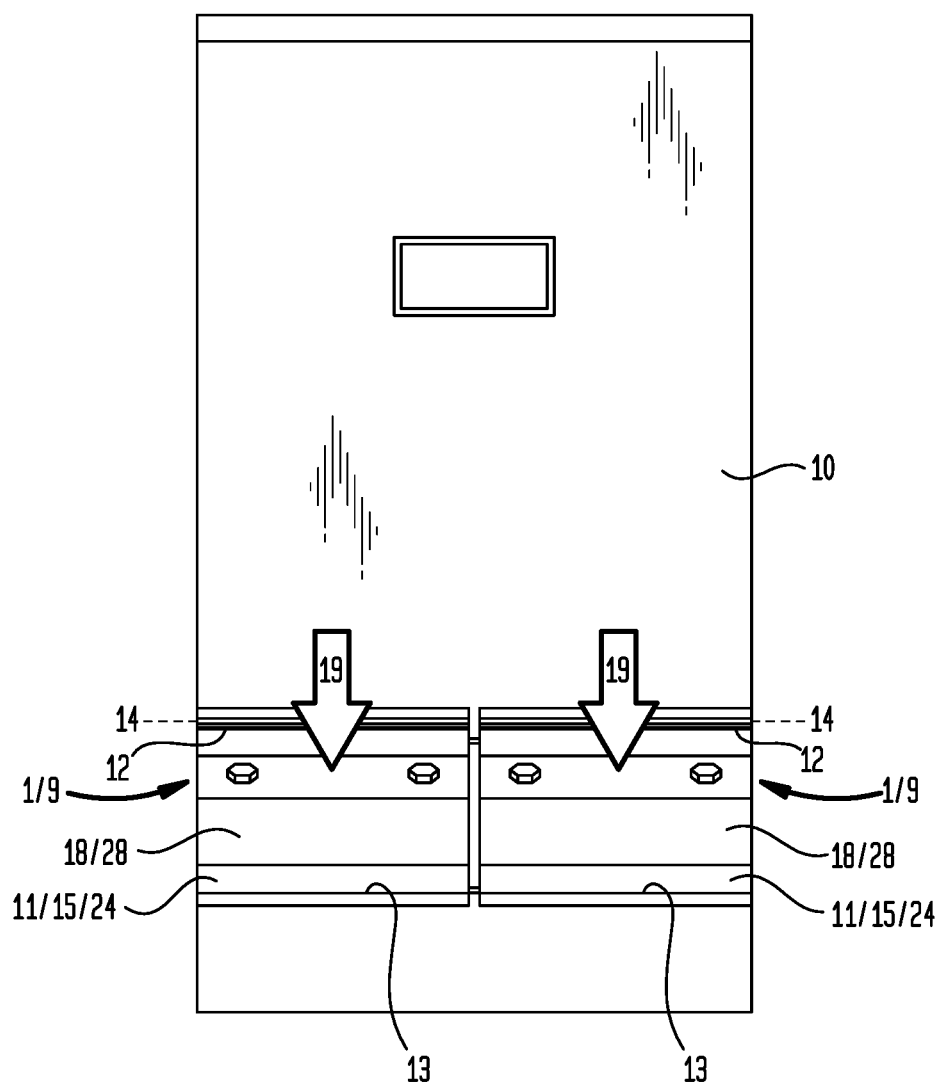
FIG. 3 is a front view of the selective access selective access device coupled to a feeder having a pair of covers configured to overlay a feeder opening, whereby the covers dispose in a first position.
Figure 4:
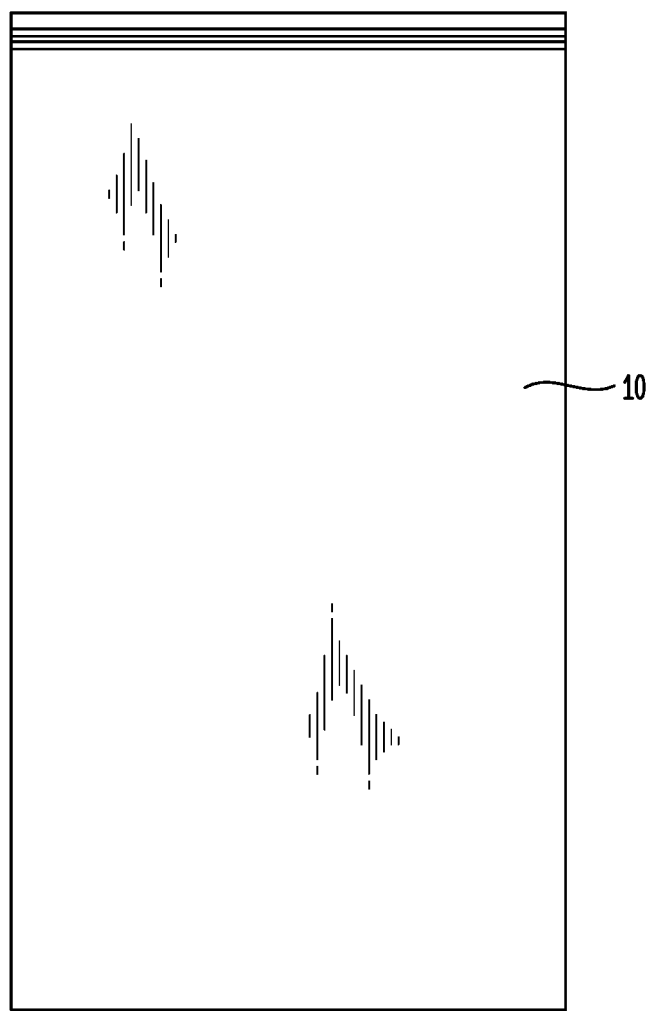
FIG. 4 is a rear view of the selective access device shown in FIG. 3.
Figure 5:
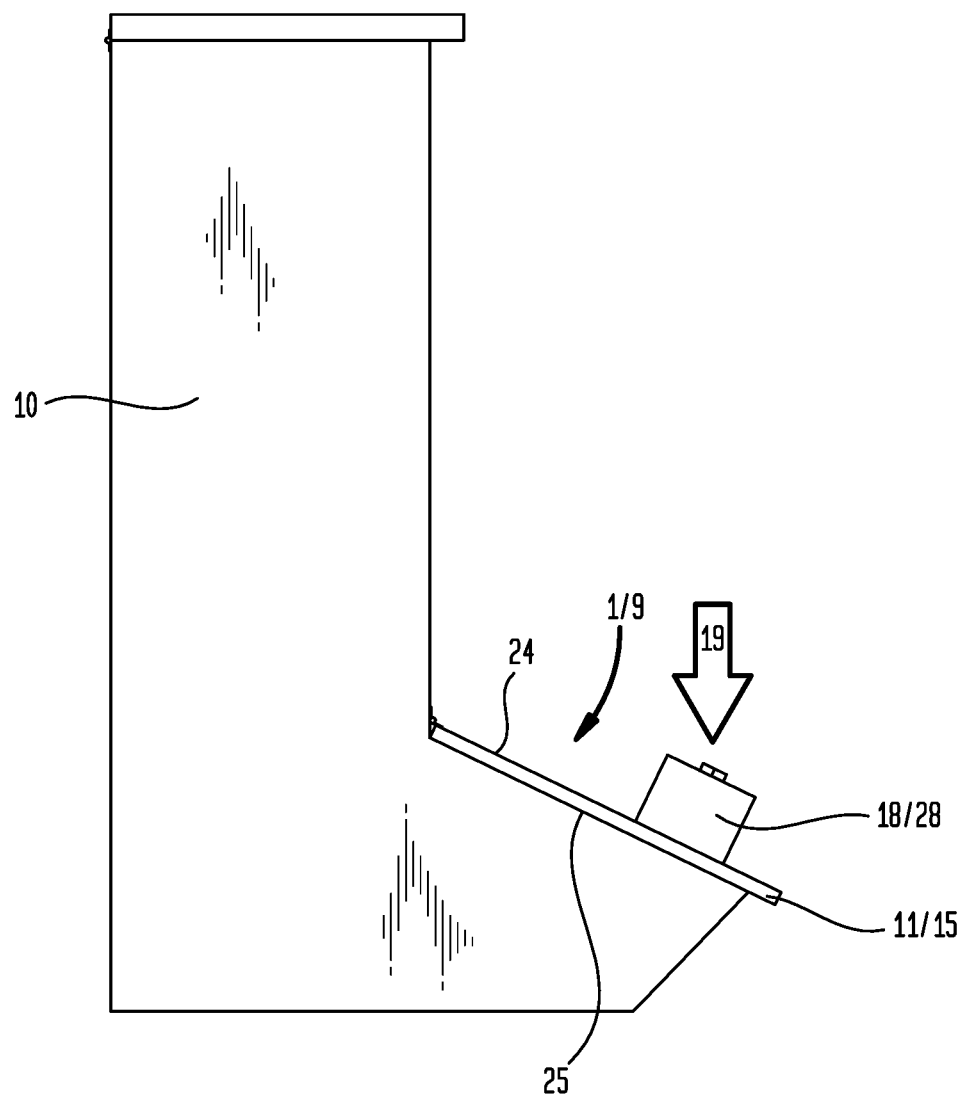
FIG. 5 is a left side view of the selective access device shown in FIG. 3.
Figure 6:
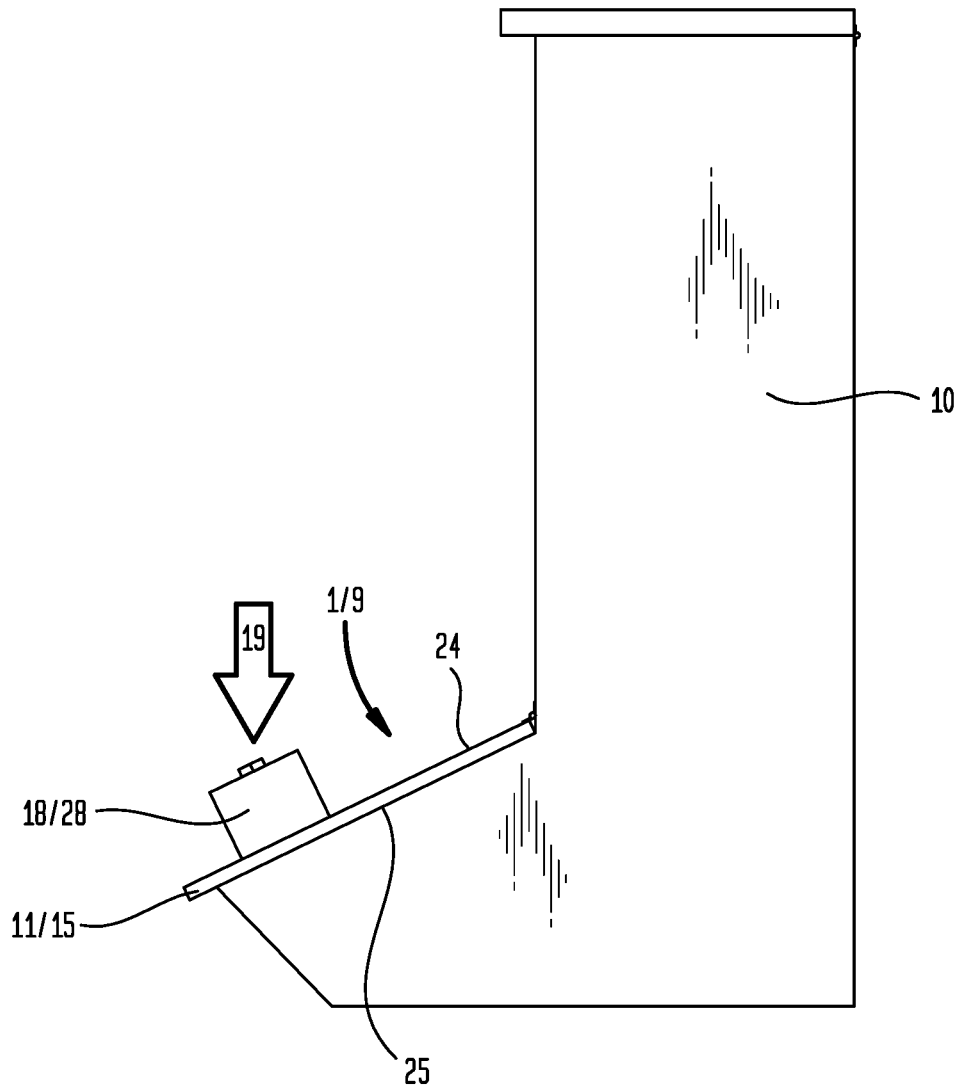
FIG. 6 is a right side view of the selective access device shown in FIG. 3.
Figure 7:
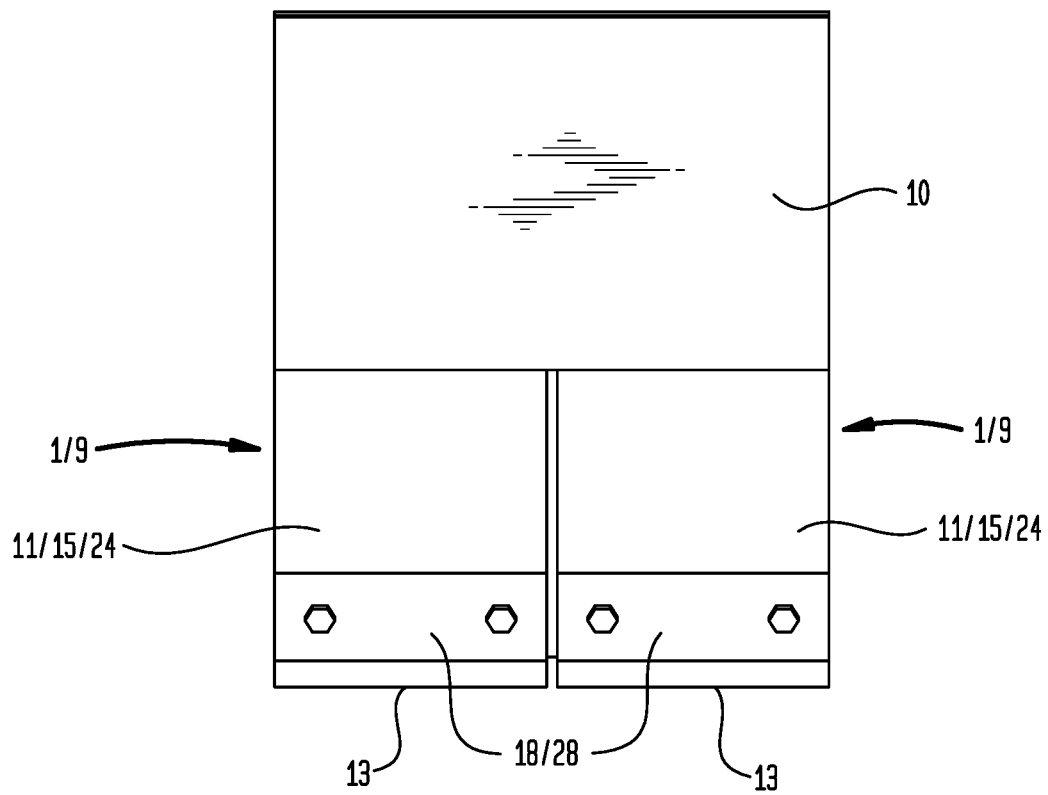
FIG. 7 is a top view of the selective access device shown in FIG. 3.
Figure 8:
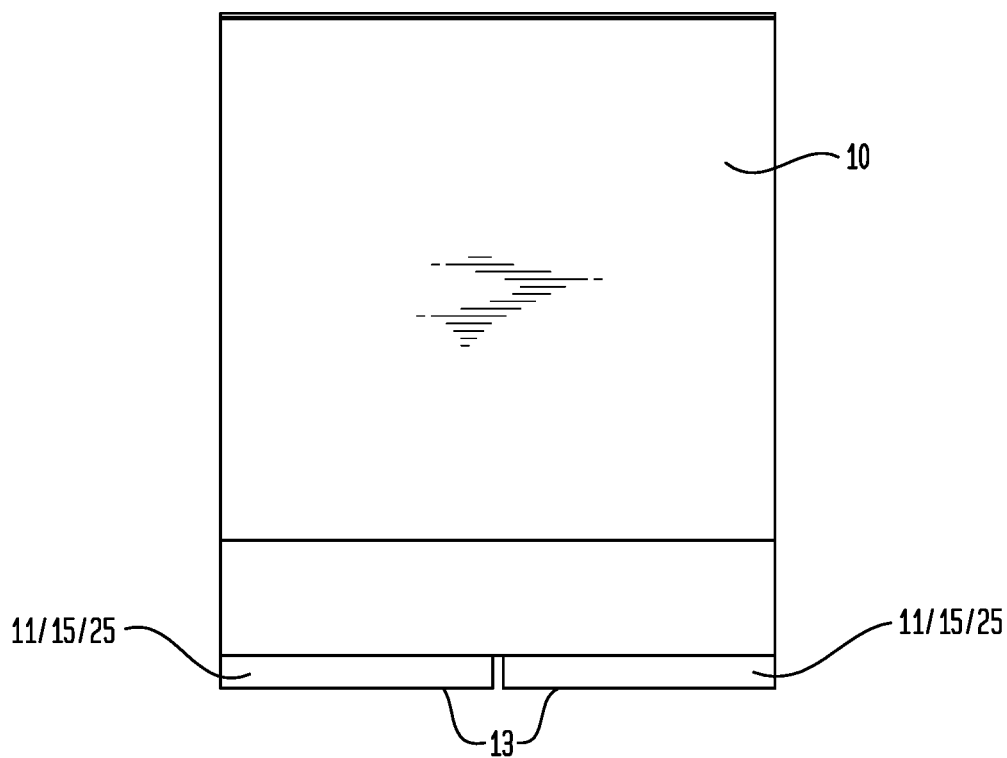
FIG. 8 is a bottom view of the selective access device shown in FIG. 3.

Now referring primarily to FIG. 1, which illustrates a method of using a particular embodiment of an inventive feral hog control system (1) to control one or more feral hogs (2), whereby the feral hog control system (1) includes bait (3) comprising a carrier material (4) and an amount of warfarin (5) which is not greater than about 0.01% by weight of the bait (3).

In relation to the present invention, the instant feral hog control system (1) is intended to control target pests embodied by one or more feral hogs (2), also termed feral pigs or wild boars, which are classified as *Sus scrofa*.

It will be appreciated that the term "feral" as used herein refers to the target pests (i.e., feral hogs (2)) which live wild such that their numbers cannot be easily controlled. Typically, feral hogs (2) have been introduced into an area, which is in contrast to native or domesticated animals.

The presence of feral hogs (2) in the wild may be unwanted, as they can adversely affect agricultural endeavors, such as crop production and grazing, as well as wildlife, such as rodents, reptiles, amphibians, and ground-dwelling birds. Additionally, feral hogs (2) may negatively impact the environment, especially as their populations increase. Thus, feral hogs (2) have been classified as pests and it is desired to keep populations of such animals to a minimum or, where possible, to completely eradicate them from the wild or from areas of high agricultural or conservation value.

For the purposes of the present invention, the term "bait" as used herein refers to the combination of at least a purposely selected carrier material (4) and a purposely selected amount of warfarin (5) for use as a target pest control agent, which is to be contrasted with, for instance, a naturally occurring material. Accordingly, the bait (3) as a whole of the instant feral hog control system (1) is palatable to feral hogs (2) and at least partially edible by feral hogs (2).

As stated above, the active agent of the instant bait (3) is warfarin (5) or $C_{19}H_{16}O_4$ (CAS Number 81-81-2), which is an anticoagulant suitable for oral administration. Without being bound by theory, warfarin (5) adversely affects feral hogs (2) following ingestion via its anti-clotting properties, which can lead to internal hemorrhaging and ultimately, death.

Preferably, the instant bait (3) includes a relatively low dose of warfarin (5), whereby "low dose" herein means an amount of warfarin (5) not greater than about 0.01% by weight of the bait (3). Upon ingestion, low dose warfarin (5) can be lethal to feral hogs (2).

In contrast, prior warfarin poisoning programs utilized bait containing 0.13% warfarin by weight of the bait (McIlroy J C, Braysher M and Saunders G R; 1989; Effectiveness of a Warfarin-poisoning Campaign against Feral Pigs, *Sus Scrofa*, in Namadgi National Park, A.C.T.; *Aust. Wildl. Res*, 1989, 16, 195-202) and 0.09% warfarin by weight of the bait (Saunders G, Kay B and Parker B; 1989; Evaluation of a Warfarin Poisoning Programme for Feral Pigs (*Sus Scrofa*); *Aust. Wildl. Res*, 1990, 17, 525-33).

Regarding results of the above-detailed warfarin poisoning campaigns, the study conducted by McIlroy et al. resulted in a 94% population reduction, with 30 of 32 feral pigs dying 9.7±0.4 (mean±s.e.) days after bait distribution, and the study conducted by Saunders et al. resulting in a 98.9% population reduction, with the first death recorded six days after bait distribution.

Conversely, studies using the instant feral hog control system (1) with bait (3) having an amount of warfarin (5) of about 0.01% by weight of the bait (3) resulted in a 100% mortality rate, with death of the feral hogs (2) occurring within not greater than about ten days following exposure to the bait (3). As to particular studies, death of the feral hogs (2) occurred within not greater than about five days following exposure to the bait (3). Notably, these results were unexpected in view of the studies by McIlroy et al. (which used bait containing 13 times the amount of warfarin (5) of the instant bait (3)) and Saunders et al. (which used bait containing 9 times the amount of warfarin (5) of the instant bait (3)), whereby the instant results are a marked improvement, both in percent population reduction and in time to death following exposure to the bait (3), over the results achieved by McIlroy et al. and Saunders et al., and should be classified as a difference in kind, rather than one of degree.

It will be appreciated that minimizing the amount of active agent (i.e., warfarin (5)) in bait (3) is advantageous for a many reasons, for example (i) because it decreases the amount of warfarin (5) introduced into the environment; (ii) because it reduces the risk of non-target animals (6) ingesting a lethal dose of warfarin (5); (iii) because it decreases the overall cost of the bait (3); and (iv) because it decreases the risk associated with preparing and handling the bait (3).

As to particular embodiments, the bait (3) of the present invention can include an amount of warfarin (5) selected from the group including or consisting of: a range of between about 0.005% to about 0.01% by weight of the bait (3); a range of between about 0.005% to about 0.009% by weight of the bait (3); a range of between about 0.005% to about 0.008% by weight of the bait (3); a range of between about 0.005% to about 0.007% by weight of the bait (3); and a range of between about 0.005% to about 0.006% by weight of the bait (3). Upon ingestion, this amount of warfarin (5) can be lethal to feral hogs (2).

As to particular embodiments, the bait (3) of the present invention can include an amount of warfarin (5) selected from the group including or consisting of: not greater than about 0.01% by weight of the bait (3); not greater than about 0.009% by weight of the bait (3); not greater than about 0.008% by weight of the bait (3); not greater than about 0.007% by weight of the bait (3); not greater than about 0.006% by weight of the bait (3); and not greater than about 0.005% by weight of the bait (3). Upon ingestion, this amount of warfarin (5) can be lethal to feral hogs (2).

As to particular embodiments, the instant bait (3) can include an amount of warfarin (5) not greater than about 0.005% by weight of the bait (3). Upon ingestion, this amount of warfarin (5) can be lethal to feral hogs (2).

Studies using the instant feral hog control system (1) with bait (3) having an amount of warfarin (5) of about 0.005% by weight of the bait (3) resulted in a 100% mortality rate, with death of the feral hogs (2) occurring within not greater than about ten days following exposure to the bait (3). As to particular studies, death of the feral hogs (2) occurred within not greater than about five days following exposure to the bait (3). Notably, like the results of the study using the instant feral hog control system (1) with bait (3) having an amount of warfarin (5) of about 0.01% by weight of the bait (3), this outcome was unexpected in view of the studies by McIlroy et al. (which used bait containing 26 times the amount of warfarin (5) of the instant bait (3)) and Saunders et al. (which used bait containing 18 times the amount of warfarin (5) of the instant bait (3)), whereby the instant results are a marked improvement, both in percent population reduction and in time to death following exposure to the bait (3), over the results achieved by McIlroy et al. and Saunders et al., and should be classified as a difference in kind, rather than one of degree.

The instant bait (3) comprising low dose warfarin (5) can be particularly suited for chronic dosing resulting from multiple feedings, which is in contrast to acute dosing. Regarding poisoning resulting from low dose warfarin (5) ingestion, symptoms do not typically develop until after a lethal dose has been consumed, thus precluding the development of bait shyness and permitting chronic dosing of feral hogs (2) via multiple feedings.

In addition to low dose warfarin (5), the instant bait (3) also includes a carrier material (4), which may be a binder (7) functioning to at least hold the bait (3) together. The low dose warfarin (5) can be used in combination with the binder (7) in any matter which will allow for the delivery of the low dose warfarin (5) to feral hogs (2). For example, the low dose warfarin (5) can be incorporated within the binder (7) or dispersed throughout the binder (7) to provide the bait (3), whereby dispersion may be accomplished by combining or mixing the desired amount of low dose warfarin (5) and the desired amount of binder (7).

As to particular embodiments, the instant bait (3) comprising low dose warfarin (5) and the binder (7) can be substantially solid or solid, meaning firm and stable in shape (not fluid or liquid) and having no space(s) or void(s) inside. As to particular embodiments, the instant bait (3) comprising low dose warfarin (5) and the binder (7) can further be substantially homogenous or homogenous, meaning of uniform composition throughout.

As to particular embodiments, the instant bait (3) can include an amount of binder (7) selected from the group including or consisting of: not greater than about 50% by weight of the bait (3); not greater than about 45% by weight of the bait (3); not greater than about 40% by weight of the bait (3); not greater than about 35% by weight of the bait (3); not greater than about 30% by weight of the bait (3); not greater than about 25% by weight of the bait (3); not greater than about 20% by weight of the bait (3); not greater than about 15% by weight of the bait (3); and not greater than about 10% by weight of the bait (3).

As but one non-limiting example, the binder (7) can comprise a wax, such as paraffin wax (CAS Number 64742-43-4).

Regarding production, as to particular embodiments, the paraffin wax, provided in granular form, can be combined with the low dose warfarin (5) to provide a mixture of granular paraffin wax and low dose warfarin (5). Following, the mixture can be heated, melting the granular paraffin wax, and compressed or extruded to generate substantially solid or solid bait blocks (8), whereby the bait blocks (8) have a configuration which can be both suitable for consumption by feral hogs (2) and can allow for relatively easy storage and transport of the bait (3).

It will be appreciated that the actual shape of the bait (3) is not a crucial parameter and that any obtainable shape is within the scope of the present invention. As to particular embodiments, the size and shape of the bait (3) may enhance target specificity. For instance, bait (3) having a larger size intended for larger target pests may decrease the likelihood that smaller non-target animals (6) could transport the bait (3) or ingest a sufficient amount of bait (3) to provide a lethal dose.

In addition to low dose warfarin (5) and the binder (7), the instant bait (3) can also include one or more attractants, such as a flavorant, a palatant, an odorant, or combinations thereof, for attracting feral hogs (2). For example, the instant bait (3) may include animal-derived components, plant-derived components, synthetic components, or combinations thereof.

Non-limiting examples of suitable animal-derived components include fish meal, bone, meat, offal, skin, egg, milk proteins, casein, fat, or the like.

Non-limiting examples of suitable plant-derived components include corn, corn products, corn meal, wheat, wheat products, wheat flour, cereal, sugar, fruits, vegetables, seeds, or the like.

As to particular embodiments, the instant bait (3) can include an amount of attractant selected from the group including or consisting of: not greater than about 90% by weight of the bait (3); not greater than about 85% by weight of the bait (3); not greater than about 80% by weight of the bait (3); not greater than about 75% by weight of the bait (3); not greater than about 70% by weight of the bait (3); not greater than about 65% by weight of the bait (3); not greater than about 60% by weight of the bait (3); not greater than about 55% by weight of the bait (3); and not greater than about 50% by weight of the bait (3).

As to particular embodiments, the carrier material (4), the attractant, or both, can be selected with consideration for non-target animals (6) to reduce potential uptake of the bait (3) by the non-target animals (6). Accordingly, the selection of the particular type and amount of carrier material (4), attractant, or both, may vary depending on the non-target animals (6) desired to deter. For instance, in a case where the non-target animals (6) include herbivores, the carrier material (4), the attractant, or both, may be selected to contain animal-derived components which would likely be avoided by herbivores.

Furthermore, as to particular embodiments, the instant bait (3) can also include one or more repellants intended to repel the non-target animals (6).

As to particular embodiments, the instant bait (3) can, but need not necessarily, further include a colorant or dye which can visibly color the bait (3), thereby allowing visible identification of bait (3) including the colorant.

As to particular embodiments, the colorant can be taken up by tissue of the feral hog (2) following ingestion to visibly color the tissue, thereby providing a visible indicium to indicate that the feral hog (2) has consumed the bait (3) and following, to discourage consumption of the feral hog (2).

As to particular embodiments, the colorant can be taken up by fat of the feral hog (2) following ingestion to visibly color the fat.

As but one illustrative example, the colorant can be Solvent Blue 36 (CAS Number 14233-37-5), which provides a blue color and, upon ingestion, can be taken up by the fat of the feral hog (2) to visibly color the fat blue.

Again referring primarily to FIG. 1, the inventive feral hog control system (1) can, but need not necessarily, further include a selective access device (9) which can be used to permit selective access to the instant bait (3) disposed within a feeder (10), whereby the selective access device (9) includes a cover (11) having opposing cover first and second ends (12)(13), the cover first end (12) configured to rotatably couple to the feeder (10) to allow the cover (11) to rotate about a rotation axis (14) between a first position (15) and a second position (16). In the first position (15), the cover (11) overlays a feeder opening (17) in which the instant bait (3) is disposed. In the second position (16), the cover (11) disposes away from the feeder opening (17) to permit access to the instant bait (3). The selective access device (9) further includes a force generator (18) coupled to the cover (11), whereby the force generator (18) generates a pre-selected force amount (19) which when unopposed, provides the first position (15) of the cover (11). The second position (16) is provided by a counterforce generator (20) which generates a counterforce amount (21) which is greater than the pre-selected force amount (19), thus opposing the pre-selected force amount (19) to dispose the cover (11) away from the feeder opening (17) to permit access to the instant bait (3).

Again referring primarily to FIG. 1, the selective access device (9) can be used to control feral hogs (2) by permitting selective access to the instant bait (3) including low dose warfarin (5) while precluding non-target animals (6), such as livestock (22) or wildlife (23) other than feral hogs (2), from accessing the instant bait (3).

For the purposes of the present invention, the term "selective" means of, relating to, or characterized by selection, whereby selection means the act of choosing something from a group.

For the purposes of the present invention, the term "access" means a way of being able to get something.

Now referring primarily to FIG. 2 through FIG. 8, the selective access device (9) includes a cover (11) having opposing cover upper and lower faces (24)(25) extending to a cover edge (26) which defines a cover periphery (27), whereby the cover (11) is configured to couple to the feeder (10) and overlay the feeder opening (17) in which the instant bait (3) is disposed.

The cover periphery (27) can define any of a numerous and wide variety of configurations of varying dimensions, depending upon the feeder opening (17) which the cover (11) is configured to overlay. As shown in the examples of the Figures, the cover periphery (27) can be generally rectangular; however the invention need not be limited to this particular configuration.

The cover (11) further includes opposing cover first and second ends (12)(13), whereby the cover first end (12) is configured to rotatably couple to the feeder (10) to allow the cover (11) to rotate about a rotation axis (14) between a first position (15) and a second position (16). In the first position (15), the cover (11) overlays the feeder opening (17) in which the instant bait (3) is disposed. In the second position (16), the cover (11) disposes away from the feeder opening (17) to permit access to the instant bait (3).

As but one non-limiting example, the cover first end (12) can be rotatably coupled to the feeder (10) via a hinge assembly, which may include a living hinge or a pair of hinge members coupled via a pivot pin which can define the rotation axis (14).

Again referring primarily to FIG. 2 through FIG. 8, the selective access device (9) further includes a force generator (18) coupled to the cover (11).

As to particular embodiments, the force generator (18) can be coupled to the cover (11) distal from the cover first end (12).

As to particular embodiments, the force generator (18) can be coupled to the cover (11) proximate the cover second end (13).

The force generator (18) can be coupled to the cover (11) via any of a numerous and wide variety of couplers as would be known to one of ordinary skill in the art, including as illustrative examples: adherents, adhesives, and mechanical fasteners.

The force generator (18) generates a pre-selected force amount (19). As relates to the present invention, selective access to the instant bait (3) disposed within the feeder (10) can be accomplished by pre-selecting a force amount of the force generator (18) such that only a counterforce generator (20), for example a feral hog (2), can supply the counterforce amount (21) which is greater than the pre-selected force amount (19).

Accordingly, only the feral hog (2) (or a comparable counterforce generator (20)) can generate a sufficient counterforce amount (21) to oppose the pre-selected force amount (19) of the force generator (18) to provide the second position (16) of the cover (11), thereby disposing the cover (11) away from the feeder opening (17) to permit access to the instant bait (3).

In contrast, a non-target animal (6) is not able to supply a sufficient counterforce amount (21) to oppose the pre-selected force amount (19) of the force generator (18) and consequently, the non-target animal (6) is not able to provide the second position (16) of the cover (11). Correspondingly, the first position (15) of the cover (11) is maintained, thereby precluding the non-target animal (6) from accessing the instant bait (3).

Again referring primarily to FIG. 2 through FIG. 8, as to particular embodiments, the force generator (18) can be configured as a weight element (28) which generates the pre-selected force amount (19), whereby the pre-selected force amount (19) corresponds to the weight of the weight element (28) or the force of gravity on the weight element (28).

The pre-selected force amount (19) generated by the weight element (28) can be selected to require the counterforce generator (20) to comprise a feral hog (2), whereby an individual feral hog (2) could supply a counterforce amount (21) which is greater than the pre-selected force amount (19) to dispose the cover (11) in the second position (16), allowing access to the instant bait (3) disposed within the feeder opening (17).

Following, the pre-selected force amount (19) of the weight element (28) can be equal to or greater than about 4.5 kilograms (about 10 pounds), which can be opposed by a typical feral hog (2) to provide the second position (16) of the cover (11), thereby disposing the cover (11) away from the feeder opening (17) to permit access to the instant bait (3).

Conversely, a non-target animal (6), which may typically be found to coexist with feral hogs (2), would not be able to supply a sufficient counterforce amount (21) to oppose the pre-selected force amount (19) of the force generator (18). Following, the non-target animal (6) would not able to provide the second position (16) of the cover (11); thus, the first position (15) of the cover (11) would be maintained and the non-target animal (6) would be precluded from accessing the instant bait (3).

As but one illustrative example, an exemplary geographical region of the United States in which the selective access device (9) may be useful for controlling feral hogs (2) includes Texas, which is home to an estimated 2 million feral hogs (2) (about 50% of all the feral hogs (2) in the United States). Within this region, non-target animals (6) which may coexist with the feral hogs (2) include livestock (22) such as cattle, goats, horses, and sheep (as non-limiting examples) and wildlife (23) such as beavers, coyotes, deer, foxes, lizards, rattlesnakes, skunks, tortoises, and turkeys (as non-limiting examples).

As a result, an embodiment of the selective access device (9) useful in this region would have a pre-selected force amount (19) of the weight element (28) such that the pre-selected force amount (19) is (a) lesser than a counterforce amount (21) which can be generated by a typical feral hog (2) and (b) greater than a counterforce amount (21) which can be generated by livestock (22) such as cattle, goats, horses, and sheep (as non-limiting examples) and wildlife (23) such as beavers, coyotes, deer, foxes, lizards, rattlesnakes, skunks, tortoises, and turkeys (as non-limiting examples). Research suggests that a weight element (28) having a pre-selected force amount (19) in a range of between about 4.5 kilograms (about 10 pounds) to about 9 kilograms (about 20 pounds) meets both criteria (a) and (b).

Thus, the pre-selected force amount (19) of the weight element (28) can be in a range selected from the group including or consisting of: between about 4.5 kilograms and about 5.5 kilograms; between about 5 kilograms and about 6 kilograms; between about 5.5 kilograms and about 6.5 kilograms; between about 6 kilograms and about 7 kilograms; between about 6.5 kilograms and about 7.5 kilograms; between about 7 kilograms and about 8 kilograms; between about 7.5 kilograms and about 8.5 kilograms; between about 8 kilograms and about 9 kilograms.

Additionally or alternatively, the pre-selected force amount (19) of the weight element (28) can be equal to or greater than a weight selected from the group including or consisting of: 4 kilograms; 4.5 kilograms; 5 kilograms; 5.5 kilograms; 6 kilograms; 6.5 kilograms; 7 kilograms; 7.5 kilograms; 8 kilograms; 8.5 kilograms; and 9 kilograms.

Additionally or alternatively, the pre-selected force amount (19) of the weight element (28) can be equal to or greater than a weight selected from the group including or consisting of: 0.1 kilograms; 0.5 kilograms; 1 kilograms; 1.5 kilograms; 2 kilograms; 2.5 kilograms; 3 kilograms; 3.5 kilograms; 4 kilograms; 4.5 kilograms; 5 kilograms; 5.5 kilograms; 6 kilograms; 6.5 kilograms; 7 kilograms; 7.5 kilograms; 8 kilograms; 8.5 kilograms; and 9 kilograms.

In addition to a weight element (28), other force generators (18) contemplated for use with the instant selective access device (9) include generators of frictional force, generators of tension force, generators of spring force, or the like.

Regarding materials, the cover (11) of the selective access device (9) can be formed from one or more of any of a numerous and wide variety of materials capable of covering a feeder opening (17) to preclude access to the instant bait (3) disposed within the feeder opening (17). As non-limiting examples, the cover (11) can be formed from materials such as: plastic, plastic-like material, metal, metal-based material, wood, wood-based material, paper, paper-based material, or the like, or combinations thereof.

Additionally, the cover (11) can be formed from any of a numerous and wide variety of processes depending upon the application, such as press molding, injection molding, fabrication, machining, printing, additive printing, or the like, or combinations thereof, as one piece or assembled from a plurality of pieces into an embodiment of the cover (11).

Again regarding materials, the weight element (28) of the selective access device (9) can be formed from one or more of any of a numerous and wide variety of materials capable of generating the pre-selected force amount (19) which when unopposed, provides the first position (15) of the cover (11). As but one non-limiting example, the weight element (28) can be formed from metal.

As to particular embodiments, the weight element (28) can be coupled to the cover (11), whereby each of the weight element (28) and the cover (11) are discrete elements. As to other particular embodiments, the weight element (28) and the cover (11) can be formed as a one-piece construct, whereby the weight element (28) is integrated with the cover (11).

As to particular embodiments, the cover (11) including the weight element (28) can replace an existing cover (11) of a feeder (10). As to other particular embodiments, the weight element (28) can be coupled to an existing cover (11) of a feeder (10), thereby retrofitting the existing cover (11) to provide the selective access device (9).

Now regarding production, a method of making the instant feral hog control system (1) includes combining a carrier material (4) and an amount of warfarin (5) to provide a bait (3), whereby the amount of warfarin (5) is not greater than about 0.01% by weight of the bait (3).

The method of making the instant feral hog control system (1) can further include providing additional components of the feral hog control system (1) as described above and in the claims.

Now regarding use, a method of controlling feral hogs (2) includes dispersing within a locus including feral hogs (2) a bait (3) comprising a carrier material (4) and an amount of warfarin (5) which is not greater than about 0.01% by weight of said bait.

The method of controlling feral hogs (2) can further include additional actions associated with use of the feral hog control system (1) as described above and in the claims.

As can be easily understood from the foregoing, the basic concepts of the present invention may be embodied in a variety of ways. The invention involves numerous and varied embodiments of a feral hog control system and methods for making and using such a feral hog control system.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "combination" should be understood to encompass disclosure of the act of "combining"—whether explicitly discussed or not—and, conversely, were there effectively disclosure of the act of "combining", such a disclosure should be understood to encompass disclosure of a "combination" and even a "means for combining". Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the feral hog control systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A bait for a feral hog, comprising:
   a carrier material; and
   an active agent contributing to the toxicity of said bait in said feral hog, said active agent consisting of an amount of warfarin not greater than about 0.01% by weight of said bait.

2. The bait of claim 1, wherein said amount of warfarin is in a range of between about 0.005% to about 0.01% by weight of said bait.

3. The bait of claim 1, wherein said amount of warfarin is not greater than about 0.005% by weight of said bait.

4. The bait of claim 1, wherein said bait is substantially homogenous, thereby having a uniform composition throughout.

5. The bait of claim 1, wherein said bait is configured as a solid bait block which has no space(s) or void(s) inside.

6. The bait of claim 1, wherein said carrier material comprises a binder.

7. The bait of claim 6, wherein an amount of said binder is not greater than about 50% by weight of said bait.

8. The bait of claim 6, wherein said binder comprises wax.

9. The bait of claim 1, wherein said bait further comprises one or more attractants.

10. The bait of claim 1, wherein said bait further comprises a colorant.

11. The bait of claim 10, wherein said colorant provides a blue color.

12. The bait of claim 11, wherein said colorant is configured for absorption by fat cells following ingestion to visibly color fat blue.

13. A bait consisting of:
    a carrier material;
    an amount of warfarin not greater than about 0.01% by weight of said bait; and
    one or more of a colorant and an attractant.

14. The bait of claim 13, wherein said carrier material comprises a binder.

15. The bait of claim 13, wherein said colorant provides a blue color.

16. The bait of claim 15, wherein said colorant is configured for absorption by fat cells following ingestion to visibly color fat blue.

17. A bait consisting of:
    a carrier material;
    an amount of warfarin not greater than about 0.005% by weight of said bait; and
    one or more of a colorant and an attractant.

18. The bait of claim 17, wherein said carrier material comprises a binder.

19. The bait of claim 17, wherein said colorant provides a blue color.

20. The bait of claim 19, wherein said colorant is configured for absorption by fat cells following ingestion to visibly color fat blue.

* * * * *